(12) United States Patent
Eichenauer et al.

(10) Patent No.: US 6,747,124 B2
(45) Date of Patent: Jun. 8, 2004

(54) PROCESS FOR WORKING UP EMULSION POLYMERS

(75) Inventors: Herbert Eichenauer, Dormagen (DE); Stefan Moss, Haan (DE)

(73) Assignee: Bayer Aktiengesellschaft, Leverkusen (DE)

( * ) Notice: Subject to any disclaimer, the term of this patent is extended or adjusted under 35 U.S.C. 154(b) by 114 days.

(21) Appl. No.: 10/017,302

(22) Filed: Dec. 14, 2001

(65) Prior Publication Data

US 2002/0111397 A1 Aug. 15, 2002

(30) Foreign Application Priority Data

Dec. 20, 2000 (DE) .......................................... 100 63 954

(51) Int. Cl.$^7$ ................................ C08J 3/03; C08F 6/22
(52) U.S. Cl. ....................... 528/486; 528/487; 528/488; 528/934; 528/936; 526/219.5; 526/191
(58) Field of Search .............................. 526/219.5, 191; 528/486, 487, 488, 934, 936; 524/29, 29.1

(56) References Cited

U.S. PATENT DOCUMENTS

| | | | |
|---|---|---|---|
| 2,366,460 A | 1/1945 | Wemon .................... 260/84.5 |
| 3,108,983 A | 10/1963 | Barclay ..................... 260/33.6 |
| 3,248,455 A | 4/1966 | Harsch et al. ............... 260/879 |
| 4,113,796 A | 9/1978 | Bischoff et al. ......... 260/876 R |
| 4,602,083 A | 7/1986 | Hung ......................... 528/488 |
| 4,876,306 A | 10/1989 | Kurokawa et al. .......... 524/423 |
| 4,948,852 A | * 8/1990 | Moore ........................ 526/247 |
| 5,028,349 A | 7/1991 | Eichenauer et al. .......... 525/72 |
| 5,063,259 A | * 11/1991 | Wanat et al. ................ 523/201 |
| 5,169,903 A | * 12/1992 | Toritani et al. ............. 525/310 |
| 5,534,594 A | * 7/1996 | Troy et al. .................. 525/310 |

* cited by examiner

Primary Examiner—James J. Seidleck
Assistant Examiner—Thao Tran
(74) Attorney, Agent, or Firm—Joseph C. Gil; Gary Matz; Aron Preis

(57) ABSTRACT

A process for working up polymer components prepared by emulsion polymerization is disclosed. The process is characterized in that coagulation of the aqueous polymer latex present after emulsion polymerization is performed using a combination of A) an aqueous solution of at least one salt selected from the group consisting of sodium chloride, calcium chloride, magnesium chloride, aluminum chloride, sodium sulfate, magnesium sulfate and aluminum sulfate, B) an aqueous solution of at least one salt of an acid selected from the group consisting of hypophosphorous acid ($H_3PO_2$), phosphorous acid ($H_3PO_3$ or $HPO_2$) and ascorbic acid and optionally C) an aqueous dilute acid selected from the group consisting of sulfuric acid, phosphoric acid and acetic acid.

9 Claims, No Drawings

PROCESS FOR WORKING UP EMULSION POLYMERS

FIELD OF THE INVENTION

The invention relates to emulsion polymerization process and more particularly to the coagulation of latex particles.

SUMMARY OF THE INVENTION

A process for working up polymer components prepared by emulsion polymerization is disclosed. The process is characterized in that coagulation of the aqueous polymer latex present after emulsion polymerization is performed using a combination of: A) an aqueous solution of at least one salt selected from the group consisting of sodium chloride, calcium chloride, magnesium chloride, aluminum chloride, sodium sulfate, magnesium sulfate and aluminum sulfate; B) an aqueous solution of at least one salt of an acid selected from the group consisting of hypophosphorous acid ($H_3PO_2$), phosphorous acid ($H_3PO_3$ or $HPO_2$) and ascorbic acid; and, optionally, C) an aqueous dilute acid selected from the group consisting of sulfuric acid, phosphoric acid and acetic acid.

BACKGROUND OF THE INVENTION

The invention provides a process for working up polymeric material systems prepared by emulsion polymerization, wherein working up of the corresponding latices is performed using a special salt mixture.

The conversion of aqueous polymer latices into polymer molding compositions is usually performed in such a way that coagulation of the latex particles is triggered by the addition of aqueous salt solutions and/or dilute acids.

Examples of salts are sodium chloride, sodium sulfate, magnesium sulfate, calcium chloride, aluminium sulfate, examples of acids are sulfuric acid, phosphoric acid, acetic acid (see, e.g., U.S. Pat. Nos. 2,366,460, 3,108,983, 3,248,455, DE-A 1 958 498).

A disadvantage of these electrolytes, which are well-known for use as coagulants, is that they may lead to a deterioration in the polymer color.

DETAILED DESCRIPTION OF THE INVENTION

It has now been found that molding compositions with greatly improved inherent color (color of the material without adding colorants) are obtained when a special material system is used in the coagulation step of emulsion polymerized polymers (herein referred to as "polymer components").

Thus, the invention provides a process for working up polymer components characterized in that the coagulation of the aqueous polymer latex resulting upon the emulsion polymerization is carried out in the presence of A) an aqueous solution of at least one salt selected from the group consisting of sodium chloride, calcium chloride, magnesium chloride, aluminium chloride, sodium sulfate, magnesium sulfate and aluminum sulfate;
B) an aqueous solution of at least one salt of an acid selected from the group consisting of hypophosphorous acid ($H_3PO_2$), phosphorous acid ($H_3PO_3$ or $HPO_2$) and ascorbic acid and optionally
C) an aqueous dilute acid preferably selected from the group consisting of sulfuric acid, phosphoric acid and acetic acid.

Compared with previously known thermoplastically processable molding compositions containing polymer components prepared by emulsion polymerization, molding compositions containing the polymer components worked up by the process according to the invention differ in that they have a much improved inherent color without the other properties being adversely affected. The invention also provides these molding compositions.

According to the invention, the individual components are used in amounts of 0.1 to 5 wt. %, preferably 0.2 to 4 wt. % and particularly preferably 0.5 to 2 wt. % of A), 0.01 to 2 wt. %, preferably 0.02 to 1.5 wt. % and particularly preferably 0.05 to 1 wt. % of B) and 0 to 5 wt. %, preferably 0 to 4 wt. % and particularly preferably 0 to 2.5 wt. % of C) (each with respect to the latex solids).

Suitable components A), according to the invention, are sodium chloride, calcium chloride, magnesium chloride, aluminium chloride, sodium sulfate, magnesium sulfate, aluminium sulfate in the form of their aqueous solutions, preferably sodium chloride, calcium chloride, magnesium sulfate and aluminium sulfate in the form of their aqueous solutions.

In principle, mixtures of these salt solutions may also be used e.g., mixtures of magnesium sulfate and aluminium sulfate.

The preferred component A) is magnesium sulfate.

The concentration of salt in the aqueous solution may be varied over a wide range. According to the invention, concentrations of 0.1 to 10 wt. % are especially suitable, in particular concentrations of 0.5 to 5 wt. %.

Suitable components B) according to the invention are salts of hypophosphorous acid ($H_3PO_2$) or phosphorous acid ($H_3PO_3$ or $HPO_2$) or ascorbic acid in the form of their aqueous solutions.

Particularly suitable salts are sodium hypophosphite, potassium hypophosphite, magnesium hypophosphite, calcium hypophosphite, sodium phosphite, potassium phosphite, calcium phosphite, sodium ascorbate, potassium ascorbate, and calcium ascorbate.

In principle, mixtures of these salt solutions may also be used here for preparing aqueous solutions, e.g., mixtures of sodium hypophosphite and sodium phosphite or of sodium hypophosphite and sodium ascorbate.

The preferred component B) is sodium hypophosphite and/or sodium phosphite and/or sodium ascorbate, particularly preferably sodium hypophosphite.

In the case of component B) the concentration in the aqueous solution may be varied over a wide range; concentrations of 0.2 to 5 wt. % are especially suitable, in particular concentrations of 0.5 to 3 wt. %.

As optional acid components which can be used in addition to A) and B), in principle any compounds present in the form of aqueous acids may be used. In practice, aqueous sulfuric acid, aqueous phosphoric acid and aqueous acetic acid have proven useful.

Aqueous sulfuric acid and aqueous acetic acid are particularly preferred, aqueous acetic acid being very particularly preferred.

Application of the combination of A) and B) and optionally C) to prepare elastic/thermoplastic and thermoplastic molding compositions according to the invention may be performed in a number of ways.

Thus, for example, an aqueous solution, in which components A) and B) and optionally C) are present together, may be used, but separate solutions of the individual components may be also used in any sequence at all for coagulation purposes.

The procedure may be such that components A), B) and optionally C) are added to the latex to be coagulated, or else the latex may be added to components A), B) and optionally C).

The following modes of operation have proven to be particularly advantageous:

1.) Adding some of or the entire amount of the aqueous solution of component B) to the latex to be coagulated, distributing this in the latex and then placing the resulting mixture in contact with the entire amount of the aqueous solution of component A) and optionally the remainder of component B) or
2.) Adding the entire amount of the aqueous solution of component A) to the latex to be coagulated or adding the latex to be coagulated to the entire amount of the aqueous solution of component A) and then placing the resulting mixture in contact with the entire amount of the aqueous solution of component B).

The optionally used additional component C) may be added at any time at all; it is preferably used together with component A).

Coagulation of the polymer present in the emulsion form using the combination of A), B) and optionally C) according to the invention may be performed at any temperature at all.

In practice, these temperatures are generally between 40° C. and 140° C., preferably between 60° C. and 100° C.; isolation of the resulting polymer component from the aqueous slurry may be achieved by conventional separating processes such as, for example, by filtration or centrifuging.

A drying step using well-known methods normally follows this isolation process.

The ratio by weight of components A:B used is 20:1 to 1:1, preferably 10:1 to 2:1 and particularly preferably 5:1 to 3:1. In the event of the additional use of component C), this is used in amounts such that the pH of the polymer slurry after the coagulation step is 3 to 8, preferably 4 to 7 and particularly preferably 4 to 6.

According to the invention, all elastic/thermoplastic and thermoplastic polymers or their thermoplastically processable mixtures with elastic polymers which are present as aqueous emulsions can be precipitated when $\leq 5$ parts by wt. (with respect to 100 parts by wt. of latex solids) of an anionic emulsifier are used during their preparation. Those latices which have been prepared using $\leq 2$ parts by wt. of emulsifier are preferred. Examples of such emulsifiers are sodium, potassium or ammonium salts of long-chain fatty acids with 10 to 20 carbon atoms, e.g., potassium oleate, alkali metal salts of dicarboxylic acids based on a cyclic hydrocarbon structure (see DE-A 36 39 904), salts of disproportionated abietic acid, salts of long-chain benzene sulfonates, e.g., sodium n-dodecylbenzene sulfonate and salts of long-chain sulfonic acids, e.g., sodium salts of $C_9$–$C_{18}$ alkylsulfonic acid mixtures.

All compounds normally used as radical-producers during emulsion polymerization may be used during preparation of the aqueous polymer emulsions; examples are potassium peroxodisulfate, ammonium peroxodisulfate, azo-bis-isobutyronitrile and redox initiator systems.

Examples of coagulatable latices are polymethylmethacrylate, polyvinylchloride, polystyrene, copolymers and terpolymers of optionally ring-substituted or side chain-substituted styrene with other resin-producing monomers such as (meth)acrylonitrile, methyl (meth) acrylate, α-methylstyrene, p-methylstyrene, vinyltoluene, and other ring-substituted or side chain-substituted styrenes, N-(cyclo)-alkylmaleic imides, N-(alkyl)-phenylmaleic imides, e.g., styrene/acrylonitrile copolymers, styrene/methyl methacrylate copolymers or α-methylstyrene/acrylonitrile copolymers and also the elastic/thermoplastic polymers prepared by polymerization of resin-producing unsaturated compounds in the presence of a rubber-elastic component, for example polybutadiene, polyisoprene or acrylate rubbers, as well as mixtures of the thermoplastic resin latices mentioned above or the latices or elastic/thermoplastic polymers with rubber-elastic latices, such as, e.g., polybutadiene, polyisoprene, poly-n-butylacrylate, butadiene/styrene copolymers, butadiene/acrylonitrile copolymers and mixtures of thermoplastic resin latices, the latex of an elastic/thermoplastic polymer and a rubber-elastic latex.

Those latices which are obtained by mixing the latex of a rubber-elastic component, for example polybutadiene or copolymers of butadiene with acrylonitrile and/or styrene with the latex of a hard and brittle component, for example a styrene/acrylonitrile or α-methylstyrene/-acrylonitrile or p-methylstyrene/acrylonitrile copolymer and optionally the latex of an elastic/thermoplastic polymer, e.g., the graft product of a resin-producing monomer such as e.g., styrene, α-methylstyrene, p-methylstyrene, (meth)acrylonitrile or methyl (meth)acrylate or their mixtures on polybutadiene, and then coagulating the latex mixture using the precipitation agent combination according to the invention described above, are preferred.

Latices of elastic/thermoplastic graft rubbers which are obtained by emulsion polymerization of monomers (preferably styrene, α-methylstyrene, acrylonitrile, methyl methacrylate, N-phenylmaleic imide or mixtures of these) in the presence of at least one elastomer latex (preferably polybutadiene or copolymers of butadiene with styrene or acrylonitrile), are very particularly preferred, with especial emphasis being placed on graft rubber latices of the ABS type such as are obtained, for example, by polymerization of 10–95 wt. %, preferably 20–70 wt. % and particularly preferably 30–60 wt. % of a mixture of styrene and acrylonitrile (ratio by wt. styrene:acrylonitrile=90:10 to 50:50) in the presence of 90 to 5 wt. %, preferably 80 to 30 wt. % and particularly preferably 70 to 40 wt. % of a butadiene polymer which may contain, copolymerized, up to 15 wt. % of a comonomer of styrene and acrylonitrile.

By mixing the special products worked up according to the invention with further polymers not prepared by emulsion polymerization, preferably rubber-free resins, molding compositions with much improved properties are obtained, without the other properties being adversely affected. These molding compositions are also provided by the present invention.

Suitable rubber-free resins based, for example, on copolymers of styrene and acrylonitrile in the ratio by weight of 90:10 to 50:50, wherein the styrene may be replaced entirely or partly by α-methylstyrene or methyl methacrylate and wherein a proportion of up to 25 wt. %, with respect to the matrix resin, of another monomer from the set maleic anhydride, bis-alkyl maleate or fumarate, maleic imide, N-(cyclo)-alkylmaleic imide, N-(alkyl)-phenylmaleic imide, indene, may also be used.

Details relating to the preparation of these resins are described, for example, in DE-A 2 420 358, DE-A 2 724 360 and EP-A 255 889. Matrix resins prepared by bulk or solution polymerization have proven especially useful.

Suitable mixing devices for blending the precipitated products with the resins are, for example, multiple roll mills, mixer-extruders or internal compounders.

To the molding compositions of the invention may be added, during preparation, working up, further processing and final shaping, conventional additives for their art-recognized function, e.g., antioxidants, UV stabilizers, peroxide destroyers, antistatic agents, lubricants, flame retardants, fillers or reinforcing agents (glass fibres, carbon fibres, etc.) and colorants.

Final shaping may be performed with commercially available processing units and includes, e.g., injection molding processing, sheet extrusion optionally followed by thermoforming, cold-forming, extrusion of pipes and profiles or calender processing.

Furthermore, molding compositions according to the invention may be used as modifiers to increase the strength of thermoplastic molding compositions consisting of individual materials or of a mixture of different materials. Examples of modifiable molding compositions are:

a) other homopolymers and mixed polymers of styrene and alkyl-substituted styrene with vinyl group-containing monomers, e.g., polystyrene, poly(p-methyl)styrene, poly (styrene-co-maleic anhydride), poly(styrene-co-acrylonitrile-co-maleic-N-phenylimide), poly(styrene-co-maleic-N-phenylimide),
b) homopolymers and mixed polymers of $C_1$–$C_4$-alkyl (meth)acrylates with vinyl group-containing monomers, e.g., polymethyl-methacrylate, poly(methyl-methacrylate-co-styrene), poly(methyl-methacrylate-co-maleic anhydride), poly(methylmethacrylate-co-styrene-co-maleic anhydride),
c) halogen-containing polymers, e.g., polyvinylchloride, polyvinylidenechloride, chlorinated polyethylene,
d) polycarbonates, e.g., based on bisphenol A, 1,1-bis-(4-hydroxyphenyl)-3,3,5-trimethylcyclohexane, tetramethylbisphenol A, tetrabromobisphenol A,
e) polyesters, e.g., based on terephthalic acid, isophthalic acid, ethylene glycol, butanediol,
f) polyamides, e.g. based on $\epsilon$-caprolactam, lauric lactam, adipic acid/hexamethylene diamine.

Molding compositions prepared according to the invention may be used in amounts of 1 to 80, preferably 5 to 50 wt. %, with respect to the entire molding composition obtained as a result of mixing.

In the following examples, parts are parts by weight and percentages are wt. %, unless stated otherwise.

EXAMPLES

Preparing an Elastic/Thermoplastic Graft Rubber Latex 58 parts by wt. (calculated as solids) of a polybutadiene latex mixture (50 wt. % with an average particle diameter $d_{50}$ of 398 nm and a gel content of 83 wt. % and 50 wt. % with an average particle diameter $d_{50}$ of 282 nm and a gel content of 58 wt. %, both prepared by radical polymerization) are adjusted to a solids content of about 20 wt. % with water. Then the mixture is heated to 63° C. and 0.5 parts by wt. of $K_2S_2O_8$ (dissolved in water) are added. Then 42 parts by wt. of a monomer mixture (ratio by wt. styrene:acrylonitrile=73:27), 0.15 parts by wt. of tert.-dodecyl mercaptan and 1.0 part by wt. (calculated as solid substance) of the sodium salt of a resin acid mixture (Dresinate 731, Abieta Chemie GmbH, Gersthofen), dissolved in water which is adjusted to an alkaline pH, are added in parallel over the course of 4 hours.

The reaction temperature is held within the range 63–65° C. during the reaction time. After adding about 1 part by wt. of a phenolic antioxidant, the latex is coagulated as described in the examples.

Example 1

5.2 kg of the latex described above are added, with stirring, to a warm solution of 200 g of Epsom salts ($MgSO_4 \times 7H_2O$) and 30 g of sodium hypophosphite in 10 l of deionised water at 30° C., then the mixture is heated to 95 to 98° C. and stirred until the polymer particles harden. The polymer powder is separated from the aqueous phase by filtering the hot precipitation mixture and dried at 70° C. after washing with water.

Example 2

Example 1 is repeated, wherein a solution of 200 g of Epsom salts and 30 g of sodium ascorbate in 10 l of deionized water is used as precipitating solution.

Example 3

Example 1 is repeated, wherein a solution of 200 g of Epsom salts, 20 g of sodium hypophosphite and 20 g of sodium ascorbate in 10 l of deionized water is used as precipitating solution.

Example 4 (Comparison)

Example 1 is repeated, wherein a solution of 200 g of Epsom salts in 10 l of deionized water is used as precipitating solution.

Example 5

Example 1 is repeated, wherein a solution of 200 g of Epsom salts and 30 g of sodium hypophosphite and 100 ml of acetic acid in 10 l of deionized water is used as precipitating solution.

Example 6 (Comparison)

Example 1 is repeated, wherein a solution of 200 g of Epsom salts and 100 ml of acetic acid in 10 l of deionized water is used as precipitating solution.

Preparing Thermoplastic Moulding Compositions Using the Graft Rubber Polymer Powders Obtained in Accordance with Examples 1 To 6

40 parts by wt. of graft rubber polymer powder, 60 parts by wt. of a styrene/acrylonitrile (SAN) copolymer resin (ratio by wt. 72:28; $\overline{M}_W$=115 000, determined by gel permeation chromatography), 2 parts by wt. ethylenediamine bis-stearylamide and 0.1 parts by wt. of a silicone oil are blended at about 190–200° C. in a Banbury type internal compounder and then processed by injection molding at 240° C. to give test items.

The following data are determined:

Notched impact resistance at room temperature ($a_k^{RT}$) according to ISO 180/1A (units: $kJ/m^2$),
Ball indentation hardness $H_c$ according to DIN 53 456 (units: $N/mm^2$),
MVI according to DIN 53 735 U (units: $cm^3$/10 min).

The color stability during processing is determined by measuring the yellowness index (YI) according to ASTM standard D 1925 (type of light: C, observer: 2°, measurement aperture: large area volume) according to the equation $$YI=(128X-106Z)/Y$$

where X,Y,Z=color coordinates according to DIN 5033 for the parts provided after the injection molding process.

The compositions tested and the test values obtained are summarized in table 1. From this, it can be seen that the molding compositions which contain polymer components obtained by the process according to the invention have much improved yellowness index values, without having an adverse effect on the other properties.

TABLE 1

Compositions and test values for compositions tested

| Example | Graft rubber polymer powder from | | | | | | SAN resin [pts by wt] |
|---|---|---|---|---|---|---|---|
| | Ex. 1 [pts by wt] | Ex. 2 [pts by wt] | Ex. 3 [pts by wt] | Ex. 4 [pts by wt] | Ex. 5 [pts by wt] | Ex. 6 [pts by wt] | |
| 1 | 40 | — | — | — | — | — | 60 |
| 2 | — | 40 | — | — | — | — | 60 |
| 3 | — | — | 40 | — | — | — | 60 |
| 4 (comparison) | — | — | — | 40 | — | — | 60 |
| 5 | — | — | — | — | 40 | — | 60 |
| 6 (comparison) | — | — | — | — | — | 40 | 60 |

| Example | $a_k^{RT}$ [kJ/m$^2$] | Hardness $H_c$ [N/mm$^2$] | MVI [cm$^3$/10 min] | YI [kJ/m$^2$] |
|---|---|---|---|---|
| 1 | 34 | 83 | 7.7 | 24 |
| 2 | 33 | 83 | 8.2 | 25 |
| 3 | 33 | 85 | 8.4 | 24 |
| 4 Comparison | 34 | 82 | 7.6 | 30 |
| 5 | 34 | 83 | 8.4 | 28 |
| 6 Comparison | 33 | 83 | 8.7 | 34 |

Additives: 2 parts by wt. ethylene diamine bis-stearylamide, 0.1 parts by wt. silicone oil

What is claimed is:

1. In the process for working up an aqueous polymer latex component prepared by emulsion polymerization, the improvement comprising coagulating the aqueous polymer latex formed after polymerization in the presence of A) an aqueous solution of at least one salt selected from the group consisting of sodium chloride, calcium chloride, magnesium chloride, aluminum chloride, sodium sulfate, magnesium sulfate and aluminum sulfate, B) an aqueous solution of at least one salt of an acid selected from the group consisting of hypophosphorous acid ($H_3PO_2$), phosphorous acid ($H_3PO_3$ or $HPO_2$) and ascorbic acid and optionally C) an aqueous dilute acid selected from the group consisting of sulfuric acid, phosphoric acid and acetic acid.

2. The process of claim 1 wherein A) is an aqueous solution of magnesium sulfate.

3. The process of claim 1 wherein B) is an aqueous solution of sodium hypophosphite.

4. The process of claim 1 wherein C) is an aqueous dilute solution of acetic acid.

5. The process of claim 1 wherein A) is an aqueous solution of magnesium sulfate and B) is an aqueous solution of sodium hypophosphite.

6. The process of claim 5 wherein C) is an aqueous dilute acetic acid.

7. The process of claim 1 wherein A) is present in an amount of 0.1 to 5% relative to the weight of the latex solids.

8. The process of claim 1 wherein B) is present in an amount of 0.01 to 2% relative to the weight of the latex solids.

9. The process of claim 1 wherein C) is present in an amount of 0 to 5% relative to the weight of the latex solids.

* * * * *